United States Patent
Geurts

[11] 3,787,133
[45] Jan. 22, 1974

[54] CLAMP AND POSITIONING STRUCTURE

[76] Inventor: Cletus J. Geurts, 530 N. Melvin, Gibson City, Ill. 60936

[22] Filed: Jan. 27, 1972

[21] Appl. No.: 221,286

Related U.S. Application Data

[62] Division of Ser. No. 124,753, March 16, 1971.

[52] U.S. Cl. ............................... 403/284, 403/409
[51] Int. Cl. ............................................. F16b 7/00
[58] Field of Search ............. 287/54 A, 54 B, 54 C, 287/189.36 F, DIG. 8; 306/1.5

[56] References Cited
UNITED STATES PATENTS

| | | | |
|---|---|---|---|
| 3,380,786 | 4/1968 | Petersen | 306/1.5 |
| 3,016,253 | 1/1962 | Launder | 306/1.5 |
| 2,569,464 | 10/1951 | Edwards et al. | 287/54 B |
| 2,424,185 | 7/1947 | Morkowski | 306/1.5 |

FOREIGN PATENTS OR APPLICATIONS

| | | | |
|---|---|---|---|
| 656,056 | 9/1963 | Italy | 287/54 A |
| 399,993 | 10/1933 | Great Britain | 287/54 C |

*Primary Examiner*—Andrew V. Kundrat
*Attorney, Agent, or Firm*—L. Paul Burd et al.

[57] ABSTRACT

An earth working implement having a high ground clearance beam connected to a frame unit having side plates. A clamp assembly having bolts and eccentric washers mounts the frame unit to a beam of the implement. A block secured to the beam cooperates with the clamp assembly to position the clamp assembly on the beam. An articulated linkage is connected to an earth working tool and pivotally joined to the frame unit. Tracks on the side plates cooperate with rollers on the standard to guide the movement of the plow bottom to a trip position without the plow bottom going below its normal earth working position. A hydraulic cylinder acting on the standard continuously holds and biases the plow bottom to its earth working position. A second hydraulic cylinder biases a colter to its earth working position.

18 Claims, 3 Drawing Figures

PATENTED JAN 22 1974    3,787,133

CLAMP AND POSITIONING STRUCTURE

CROSS REFERENCE TO RELATED APPLICATION

This application is a division of U.S. Application Ser. No. 124,753 filed Mar. 16, 1971.

BACKGROUND OF THE INVENTION

A conventional agriculture plow and similar earth working tools have one or more plow bottoms attached to beams mounted on a generally horizontal frame. The frame is connected to a draft vehicle, as a tractor, with an adjustable hitch. The plow beams are located relatively close to the ground when the plow bottoms are in the ground working position. The result is that in fields with large amounts of trash, as corn stalks, straw, beans and the like, the low clearance of the plow beams causes the trash to collect and block the plow. The collected trash interferes with the action of the colters and the turning of the trash by the plow bottoms. It is a common practice to mulch or chop the trash prior to plowing. This consumes considerable time, power and expense. Chopping and mulching devices have been applied to plows to break up the trash.

In addition to trashy conditions of agricultural lands, many soils may contain rocks, or similar obstructions which must be cleared by the plow bottom. Plow bottom trip releases are used to permit the plow bottoms to move back and over the obstructions. These trip releases are not particularly suitable with use in a high clearance plow. By increasing the height of the plow beams, there is a corresponding increase in the length of the standard and considerable lateral loading of the standard. This subjects the standard and the connecting linkages to suitable twisting and torsion forces. The result is excessive wear, and considerable breakage of the linkage when conventional plows are modified as high clearance plows. An example of a low beam plow is shown in U.S. Pat. No. 3,349,855.

Earth working tools, as plow bottoms, cultivator shovels, chisel points, and the like, are conventionally attached to standards or tool holders. The standards are connected to support means or tool bars of the implement with frames or clamps. The frames are mounted on the beams with bolts which extend through holes in both the frames and the beams. An example of this type of mounting structure for a plow bottom is shown by Moe in U.S. Pat. No. 3,599,728. The holes in the beams are either drilled or punched. These operations require considerable time and labor and structurally weaken the beams. The structural members used in implements have standard mill tolerances as well as slight differences in the shapes. These tolerances make it difficult to drill the members with accuracy. Clamps have been used with tool bar structures to mount the tool holders or standards without the use of holes through the tool bar. Examples of clamping structures are shown in U.S. Pat. Nos. 1,410,084 and 3,380,786.

SUMMARY OF THE INVENTION

The invention generally relates to a clamp assembly usable to mount an object, as an earth working tool unit, to a support or beam. The clamp assembly is usable with a positioning block secured on the beam to locate the clamp assembly on the beam. The clamp assembly has clamp means operable to vertically and horizontally mount the assembly on the support. The clamp assembly has a first member and a second member located on opposite sides of the support. These members are connected to each other with a third means engageable with a portion of the support. A first clamp means holds the first member and the second member on the support in one direction. A rotatable means having an off-center axial passage or eccentric means is mounted on the first clamp means and is operable to clamp the first clamp means and third means in engagement with the support in a direction generally normal to said one direction. In one form of the invention, the first clamp means is an elongated rotatable bolt and the eccentric means comprises a pair of eccentric members that are rotatably mounted in the first and second members. Each concentric member has a hole for accommodating the elongated bolt whereby the bolt clamps the first member and second member on the support and the eccentric means clamp the bolt and third means to the support. The clamp assembly is positioned on the support with a stationary means secured to the support. The stationary means cooperates with the first member to locate the clamp assembly on the support.

An object of the invention is to provide a clamp assembly that can be mounted on a beam or support without the necessity of drilling holes in the beam with a minimum of labor and cost. A further object of the invention is to provide a clamp assembly that can be readily assembled on a beam and that will clamp in normally disposed directions. Another object of the invention is to provide a clamp assembly that is usable with conventional structural members that have standard tolerances and is adjustable to accommodate variations in these tolerances. Yet another object of the invention is to provide a clamp assembly that cooperates with a positioning plate on the stationary member on a beam to locate the position of the clamp assembly relative to the beam.

IN THE DRAWINGS

Figures 2, 3:
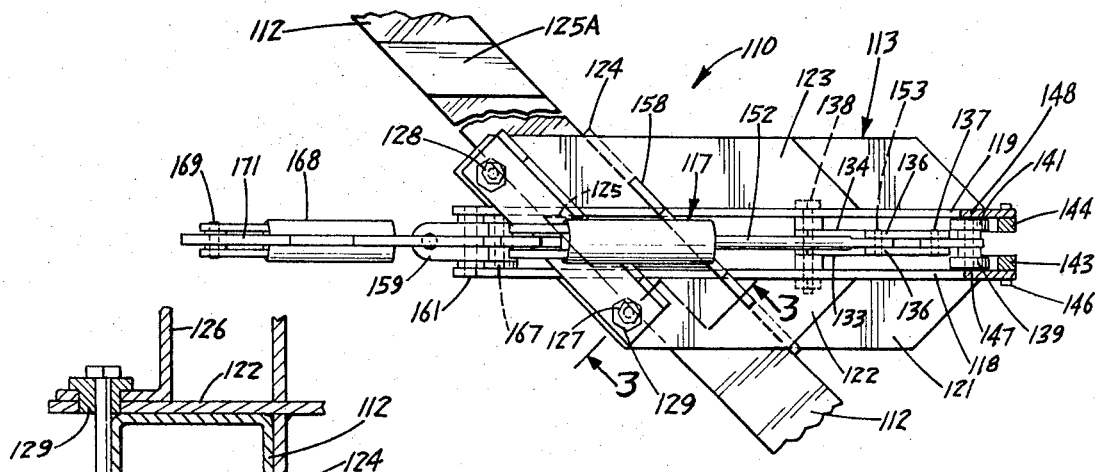
FIG. 2 is a top plan view of FIG. 1 partly sectioned.
FIG. 3 is an enlarged sectional view taken along line 3—3 of FIG. 2.
Figure 1:
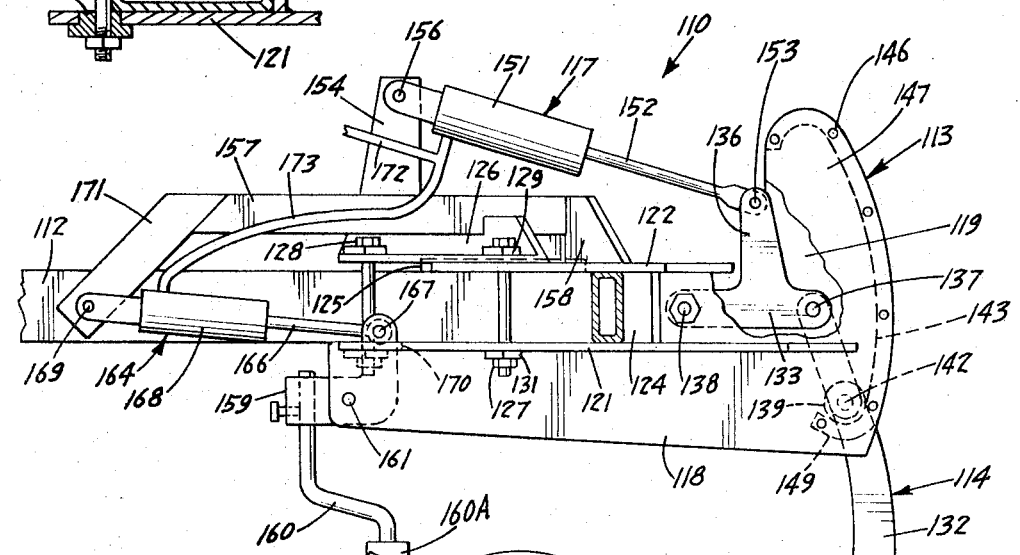
FIG. 1 is a side elevational view of a full hydraulic plow bottom holding and release mechanism mounted on a plow beam with a clamp assembly and positioning structure of the invention.

Referring to FIGS. 1 and 2, there is shown a mold board plow bottom assembly indicated generally at 110 mounted on a diagonal box beam 112 of a plow. The assembly 110 has a frame unit 113 accommodating articulated linkage members 114 connected to an earth working tool shown as a mold board plow bottom 116. The bottom 116 can be replaced with other earth working tools, as listers, chisel plows, harrow teeth and like earth working tools. A hydraulic cylinder unit 117 subjected to relatively low pressure is connected to the articulated linkage 114. Unit 117 is an energy storing means comprising a piston and cylinder assembly which operates to continuously store and transmit a force to the linkage members 114 to bias the earth working tool 116 in its forward normal ground working position.

The frame unit 113 has generally parallel upright side members or plates 118 and 119 secured to a bottom generally horizontal plate 121. Outwardly directed top plates 122 and 123 are secured to the top edges of side members 118 and 119. An upright diagonal back plate 124 extends between and is secured to the bottom plate 121 and the top plates 122 and 123. As shown in FIG. 3, plates 121, 122 and 124 form a generally U-shaped structure accommodating the box beam or support 112. A generally flat positioning block or plate 125 is secured to the top of box beam 112. Side plates 118 and 119 extend adjacent the opposite sides of block 125, thereby locating the frame unit 113 on the box beam without the use of holes in the beam. The block 125 eliminates costly holes in the beam and bolts to attach the frame unit 113 to the beam 112. Beam 112 has additional blocks 125A to locate other frame units on the beam.

Secured to the forward ends of the top plates 122 and 123 is a diagonal angle member 126. Nut and bolt assemblies 127 and 128, located in vertically aligned holes in plates 121 and 123 and angle member 126 function to vertically clamp the frame unit 113 on the diagonal beam 112. As shown in FIG. 3, eccentric or off-center holders, bushings, or washers 129 and 131 surround opposite end portions of the bolts adjacent the nuts of nut and bolt assemblies 127 and 128. Eccentric holders 129 and 131 are rotatable to firmly hold, by longitudinally clamping, the frame unit 113 in assembled relation with the box beam 112. Eccentric holders 129 and 131 each have a cylindrical body rotatably located in a hole in the plate. The body is attached to an enlarged head adapted to accommodate a wrench or similar tool used to rotate the eccentric holder. This structure is shown in FIG. 3. The holders 129 along with the nut and bolt assemblies 127 and 128 facilitate the mounting of frame unit 113 on the beam 112 with a minimum of machining and labor. The frame unit 113 is a standard assembly interchangeable with other assemblies having box-shaped beams.

Articulated linkage 114 comprises a generally upright standard 132 having a lower end secured to the mold board plow bottom 116. The upper portion of the standard 132 extends between side plates 118 and 119 and is pivotally connected to a pair of generally horizontal links 133 and 134 with a generally transverse pin 137. Links 133 and 134 have upright arms 136 connected to the hydraulic cylinder unit 117. The forward ends of links 133 and 134 are pivotally connected to side plates 118 and 119 with a transverse pivot pin 138.

Rotatably mounted on standard 132 below pivot pin 137 is a pair of rollers 139 and 141. A transverse axle 142 secured to the standard 132 rotatably mounts the rollers 139 and 141 on opposite sides of the standard. Located on adjacent portions of the insides of side members 118 and 119 are generally upright convex curved tracks 143 and 144 providing cam surfaces for rollers 139 and 141. Bolts 146 secure tracks 143 and 144 to the two rear upright portions 147 and 148 of the side members 118 and 119. As shown in FIG. 1, lower ends of tracks 143 and 144 have upwardly directed curved portions 149 which serve as stops for limiting the forward and downward motion of standard 132. When rollers 139 and 141 engage portions 149, the plow bottom 116 is in its normal earth working position.

The hydraulic cylinder unit 117 comprises a cylinder 151 carrying a piston (not shown) connected to a piston rod 152. A pivot pin 153 connects the outer end of rod 152 to the upper end of arms 136. The head end of cylinder 151 is located adjacent generally upright support 154. Member 157 is secured to top plates 122 and 123.

Located adjacent the forward lower portions of the side plates 118 and 119 is an angle member 159. A transverse pivot 161 connects the member 159 to side plates 118 and 119. Adjustably connected to the forward end of member 159 is an upright rod or standard 160. Rotatably mounted on the lower end of rod 160 is an upright sleeve 160A. A rearwardly directed arm 162 rotatably carrying an upright colter disc 163 is secured to sleeve 160A. The cylinder unit 164 has a piston rod 166 connected with a pivot member 167 to the upper end of the member 159. The head end of cylinder 168 is connected with a pin 169 to a downwardly directed projection or support 171. Support 171 is connected to the forward end of longitudinal member 157. Member 159 engages a transverse stop edge 170 on plate 121 to limit the pivotal movement of the member, thereby determining the normal ground working position of colter disc 163.

Both hydraulic cylinder units 117 and 164 are connected to a common source of hydraulic fluid under pressure through a hydraulic line 172. A separate hydraulic line 173 connects the cylinder 164 with the line 172. The source of hydraulic pressure can be an accumulator, the hydraulic system of the power unit or tractor operating the plow.

In use, a plow having a plurality of plow bottom assemblies 110 mounted on a diagonal beam 112 is connected to a power unit, as a tractor. Each assembly 110 has articulated connected linkage members 132, 133 and 134 which work with the coacting rollers 139 and 141 and guide tracks 143 and 144 to control the normal working depth of the plow bottom, and the tripping and reset path of the plow bottom. The coacting roller, track and side plate structures provide side or lateral as well as longitudinal and suction force receiving members or anchors for the standard 132. This structure enables the plow beam 112 to be positioned at a relatively high elevation with respect to the ground, giving the plow high ground clearance. A high clearance plow beam is advantageous in working extremely trashy fields, as picked corn fields. The lateral forces on the standard 132 are taken by the frame unit 113. This alleviates most of the twisting forces on the pivot pins 137 and 138.

The hydraulic cyliner unit 117 provides a continuous biasing force on arms 136 to hold the articulated linkage 114 in its normal ground working position. This is the only force holding the linkage down. With substantial forces being taken by the coacting roller and track guide means, a relatively low pressure cylinder unit 117 can be used to operate the plow bottom assembly without slamming the standard back to its forward position. When the plow bottom 116 hits an obstruction the point of the plow bottom 116 will move upwardly without going below its normal working depth. The linkage 132 and 133 folds upwardly against the biasing force of the cylinder unit 117. As soon as the plow bottom passes over the obstruction, the biasing force of the cylinder unit 117 resets or moves the plow bottom back to its normal earth working position. The plow bottom 116 resets without stopping the forward motion of the plow.

The colter disc 163, located forwardly in the plow bottom 116, is biased to its earth working position by the second cylinder unit 164. With both the first cylinder unit 117 and the second cylinder unit 164 are connected to a common source of fluid under pressure, both the plow bottom 116 and colter disc 163 are held in their ground working positions with comparable amounts of force.

The hydraulic cylinder units 117 and 164 are located at least at the elevation of the plow beam 112 so they do not interfere with trash or foreign material that may be laying on the ground. When colter disc 163 strikes an object, as a rock, it will pivot upwardly and ride over the object. Hydraulic cylinder unit 164 is yieldable, biasing the arm 159 to reset and hold the disc 163 in its ground working position. When plow bottom 116 strikes an object, as a rock, the plow bottom along with standard 132 will ride upwardly along the path of tracks 143 and 144, moving the links 133 and 134 in a forward position.

Hydraulic cylinder unit 117 will be contracted as the plow bottom 116 moves upwardly against its hydraulic biasing force. The plow bottom 116 moves out of the ground without the point of the plow share going below the normal working depth. As soon as the plow bottom 116 passes over the object, hydraulic cylinder unit 117 will force the plow bottom 116 back to its ground working position. This is an automatic operation which is accomplished without stopping, reversing or changing the speed of the plow.

While there has been shown and described a preferred embodiment of the invention, it is understood that various changes in the details of the hydraulic holding, release and return mechanism, clamp assemblies and positioning structure of the plow, plow bottom and colter may be made by those skilled in the art without departing from the spirit of the invention.

The embodiments of the invention in which an exclusive property or privilege is claimed are defined as follows:

1. A clamp assembly mountable on a support comprising: first means engageable with a first portion of the support, second means engageable with a second portion of the support generally opposite the first portion, third means connected to the first means and second means located adjacent a third portion of the support, said first means and second means having holes generally aligned with a fourth portion of the support generally opposite the third portion, rotatable means having portions thereof located said holes, each rotatable means having an off-center axial passage, fourth means extended through said off-center axial passages of the rotatable means and engageable with said fourth portion of the support, said rotatable means being rotatable to move and hold the third means and fourth means in clamping engagement with the support, and means cooperating with the fourth means to move and hold the first means and second means in clamping engagement with the support.

2. The clamp assembly of claim 1 wherein: said first means has a pair of laterally spaced members, each member having a hole, said second means having holes generally aligned with the holes in the members, said rotatable means having portions located in said holes in the members and second means, said fourth means comprising separate members extended through the passages in the aligned rotatable means.

3. The clamp assembly of claim 2 in combination with: means secured to the support and located between said laterally spaced members to locate the position of the clamp assembly on the support.

4. The structure of claim 3 wherein: said means secured to the support has side edges cooperating with the laterally spaced members to limit lateral movement of the clamp assembly on the support.

5. The clamp assembly of claim 1 in combination with: means secured to the support cooperating with the first means to locate the position of the clamp assembly on the support.

6. The structure of claim 5 wherein: the means secured to the support is a block means.

7. The clamp assembly of claim 1 wherein: the rotatable means includes eccentric means rotatable to clamp the third means and fourth means on the support.

8. The clamp assembly of claim 1 wherein: the fourth means includes a bolt and nut assembly connecting the first means with the second means operable to clamp the first means and second means on the support and said rotatable means includes eccentric means rotatable on the bolt and nut assembly to clamp the bolt and fourth means to the support.

9. A clamp assembly attachable to a support comprising: first means engageable with one side of the support, second means positionable adjacent the side opposite the one side of the support, rigid means extended transversely between the first means and second means and attached thereto, said rigid means being engageable with a third side of said support, first clamp means connecting the first means and second means and engageable with the side opposite the third side of the support and operable to clamp the first means and the second means on the support in one direction, eccentric rotatable means mounted on the first clamp means and engageable with the first means and second means to clamp the rigid means and first clamp means to opposite sides of the support in the direction generally normal to said one direction, said first clamp means comprises at least one bolt extended between said first means and said second means, said eccentric rotatable means comprising eccentric washers rotatably mounted on said bolt, said washers having portions located in holes in said first means and said second means whereby rotation of said eccentric washers will clamp the rigid means and bolt means in engagement with opposite sides of the support.

10. The clamp assembly of claim 9 in combination with: means secured to the support and engageable with a portion of the clamp assembly for locating the clamp assembly on the support.

11. The clamp assembly of claim 9 wherein: the first means is a plate located on one side of the support and the second means is a second plate located on the opposite side of the support.

12. The clamp assembly of claim 9 wherein: the first clamp means is a bolt operable to clamp the first means and second means into engagement with opposite portions of the support.

13. A structure for mounting and positioning a clamp assembly on a support comprising: a clamp assembly having first means engageable with a first portion of the support, second means engageable with a second portion of the support generally opposite the first portion, fixed means connected to the first means and second means and engageable with a third portion of the support, clamp means connected to the first means and second means to hold the first means and second means in engagement with the support, said clamp means having a first clamp member acting on the first means and second means to hold the first means and second means in engagement with the support and at least one second clamp member movably mounted on the first clamp member to hold the fixed means and first clamp member in engagement with the support, said second clamp member having a pair of eccentric washers rotatably mounted on the first clamp member, one of said washers mounted in a hole in the first means and the other of said washers mounted in a hole in the second means, and stationary means secured to the support cooperating with the first means to locate the position of the clamp assembly on the support.

14. The structure of claim 13 wherein: said first clamp member is a nut and bolt assembly.

15. The structure of claim 14 wherein: the first means has a first portion located adjacent one side of the stationary means and a second portion located adjacent the other side of the stationary means, said clamp means having a pair of first and second clamp members connecting said first and second portions to the second means.

16. The structure of claim 15 wherein: the stationary means has side edges cooperating with the first portion and the second portion of the first means to limit lateral movement of the clamp assembly on the support.

17. The structure of claim 15 wherein: said first clamp members are nut and bolt assemblies.

18. The structure of claim 13 wherein: the stationary means secured to the support is a block means.

* * * * *